United States Patent Office 2,854,932
Patented Oct. 7, 1958

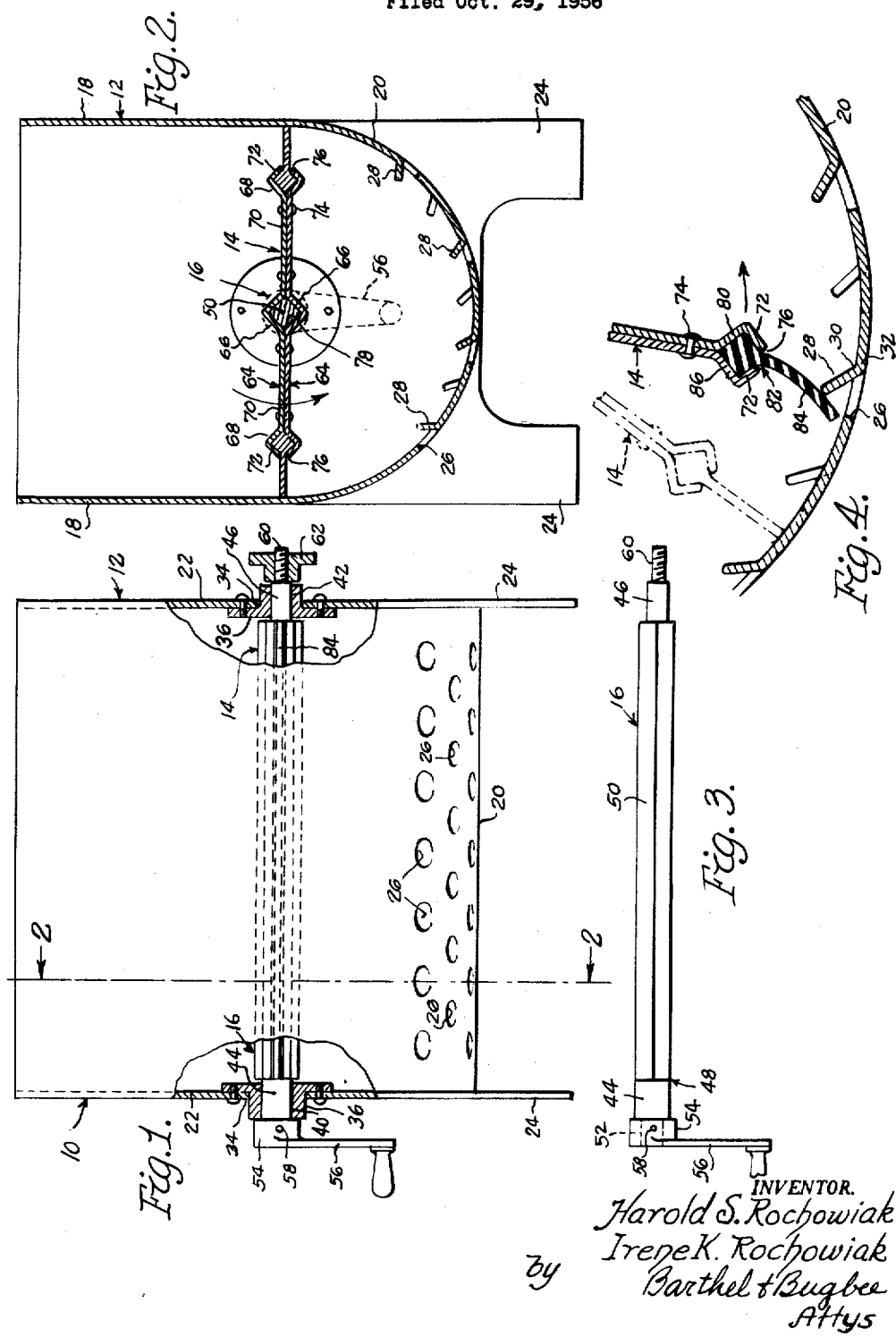

2,854,932
NOODLE-MAKING UTENSIL

Irene K. Rochowiak and Harold S. Rochowiak, Detroit, Mich.

Application October 29, 1956, Serial No. 618,932

4 Claims. (Cl. 107—14)

This invention relates to cooking utensils and, in particular, to utensils for making noodles, macaroni, spaghetti and other edible cooked paste products.

One object of this invention is to provide a noodle-making utensil which extrudes the batter placed therein through the bottom thereof into a cooking kettle beneath it and at the same time cuts off the extruded strips or ribbons of material in suitable lengths for cooking and eating.

Another object is to provide a noodle-making utensil of the foregoing character having a rotary or swinging blade equipped with flexible edge portions or wipers which yieldably engage the edges of extrusion apertures in the utensil and urge the batter through the hole and then cut it off into suitable lengths by a yielding shearing action.

Another object is to provide a noodle-making utensil of the foregoing character wherein the rotary blade is in the form of a diametral plate which, when held in a horizontal position, temporarily forms a bottom to the utensil while the batter is being placed in the utensil, thereby serving as a damper so as to temporarily store the batter at the top of the container until the blade is rotated into a vertical position to permit the batter to drop into the lower part of the container.

Another object is to provide a noodle-making utensil of the foregoing character wherein the rotary plate or blade is removably mounted in the container so as to be detachable for cleaning, the resilient edge portions or wipers being also preferably removably mounted in the blade for cleaning and for replacement when worn.

Other objects and advantages of the invention will become apparent during the course of the following description of the accompanying drawings, wherein:

Figure 1 is a side elevation of a noodle-making utensil according to one form of the invention, with portions broken away to show the mounting structure for the rotary blade;

Figure 2 is a cross-section taken along the line 2—2 in Figure 1;

Figure 3 is a side elevation of the shaft for the rotary blade, removed from the utensil; and Figure 4 is an enlarged fragmentary view of a portion of the bottom of the utensil showing the action of the blade with its resilient wipers in urging the batter through the extrusion holes.

Referring to the drawings in detail, Figure 1 shows a noodle-making utensil, generally designated 10, according to one form of the invention as consisting generally of a container 12 in which is mounted a rotary or swinging blade 14 carried by a crank shaft assembly 16. The container 12 is of roughly trough-shaped form having parallel sides 18 (Figure 2) integral with a semi-cylindrical bottom 20, the ends being closed by approximately rectangular end plates 22 provided at their lower ends with feet 24 adapted to rest on the cooking kettle (not shown). The sides 18 and bottom 20 are united with the end plates 22 in any suitable manner, as by welding. The lower portion of the bottom 20 is provided with multiple extrusion holes 26 preferably incompletely punched so that the punching or nearly circular tab 28 of each hole has a narrow neck portion 30 which is integral with the adjacent portion 32 of the bottom 20 and projects upwardly at an acute angle thereto (Figure 4).

Fitted into aligned holes 34 in the opposite end plate 22 are flanged bearing members 36 secured thereto by screws or other fasteners 38 (Figure 1) and provided with aligned bearing bores 40 and 42 of different diameters. Rotatably mounted in the bearing bores 40 and 42 are the large and small diameter bearing portions 44 and 46 respectively of a blade-rotating shaft, generally designated 48, having an elongated portion 50 of square or other non-circular cross-section extending between the bearing portions 44 and 46 and occupying the major portion of the shaft 48. Outwardly of the bearing portion 44, the shaft 48 is provided with a reduced diameter portion 52 upon which the hub 54 of a hand crank 56 is drivingly secured, as by a pin 58 extending therethrough. Outwardly of the smaller diameter bearing portion 46, the shaft 48 is provided with a still further reduced diameter threaded portion 60 which is adapted to receive a knurled internally-threaded hand wheel or nut 62. The blade 14 which is swingably or rotatably mounted upon the intermediate shaft portion 50 of non-circular cross-section is built up from a pair of similarly-shaped but oppositely-facing stamped halves 64 each having a trough-shaped central portion 66 and trough-shaped edge portions 68, all of approximately V-shaped cross-section, with flat portions 70 extending between them. The blade halves 64 are preferably stamped from sheet metal and the trough-shaped edge portions 68 have slightly narrower edge flanges 72 so that when the halves 64 are united face to face, as by rivets 74, with their trough portions 66 and 68 facing one another (Figure 2), gaps 76 are left between the edge flanges 72.

When the blade halves 64 are thus assembled and secured to one another, the oppositely-facing central portions 66 in assembly form a passageway or bore 78 of rectangular cross-section which slidably receives the major portion 50 of the shaft 48, also of rectangular cross-section. The oppositely-facing edge portions 68, on the other hand, slidably receive the rib-shaped bases 80 of resilient wipers, generally designated 82, having wiping strip portions 84 (Figure 4) projecting therefrom through the gaps 76. The base portions 80 are of rectangular cross-section so as to slidably and removably fit the channel 86 of approximately rectangular cross-section formed thereby and open at the gap 76. The blade 14 and its wipers 82 are of such widths that in assembly they extend across the diameter of the bottom portion 20 of the container 12 into wiping sealing engagement with the opposite side walls 18 thereof at their junction with the bottom wall 20. The holes 34 in the end plate 22 are of course so located that the axes of the bearing bores 40 are located coincident with the axis of the cylindrical bottom portion 20.

In the operation of the utensil 10, let it be assumed that the device has been assembled in the condition shown in Figures 1 and 2, with the blade 14 moved into the horizontal position shown in Figure 2. Having mixed the batter with the usual ingredients and into the desired consistency, the user places the utensil 10 on top of a kettle of boiling water with the feet 24 resting on the upper edge or rim of the kettle and pours the batter into the space above the blade 14 between the parallel sides 18 of the container 12.

The operator then rotates the shaft 48 by means of the hand crank 56, thereby rotating the blade 14. The rotation of the blade 14 simultaneously drops the batter onto the perforated bottom 20 of the container 12 and forces the batter through the perforations 26 thereof, the resilient wiping strip portions 84 of the wipers 82 urging the material through the extrusion holes 26 and parting the extruded strings of batter at their upper ends, against the edges of the tabs 28 as the wiper portions 84 move yieldably over the tabs 28 with a wiping action, as shown in Figure 4, after sliding along the unperforated portions of the bottom 20. In place of a rotary motion of the shaft 50, it may be swung to and fro to rock the blade 14 back and forth to extrude the batter through the extrusion holes 26.

To disassemble and clean the utensil 10, the user unscrews the hand wheel or nut 62 from the threaded portion 60, and pulls outward on the handle 56, withdrawing its central squared portion 50 slidably out of the portion of square cross-section between the trough-shaped central portions 66 of the blade halves 64. This action frees the blade 14 for removal from the container 12, whereupon the resilient wipers 82 can be slid endwise of the blade 14 out of their respective grooves or channels 86. After the container 12 has been cleaned, the wipers 82 and the blade 14, as well as the crankshaft assembly 16 may be then cleaned and reassembled by reversing the foregoing procedure.

What we claim is:

1. A noodle-making utensil comprising a receptacle having a bottom wall of substantially semi-circular cross-section with multiple extrusion holes therethrough, a shaft rotatably mounted in said receptacle with its axis coincident with the center of curvature of said bottom wall, and a blade mounted on said shaft and peripherally engaging said bottom wall, said blade extending diametrically and continuously across said bottom wall between the opposite sides thereof and forming a substantially solid rotary partition between said opposite sides with its opposite edges in engagement with said opposite sides of said bottom wall.

2. A noodle-making utensil comprising a receptacle having a bottom wall of substantially semi-circular cross-section with multiple extrusion holes therethrough, a shaft rotatably mounted in said receptacle with its axis coincident with the center of curvature of said bottom wall, and a blade mounted on said shaft and peripherally engaging said bottom wall, said blade extending diametrically and continuously across said bottom wall between the opposite sides thereof and forming a substantially solid rotary partition between said opposite sides with its opposite edges in engagement with said opposite sides of said bottom wall, said blade having a resilient wiper removably mounted at each of said opposite edges of said blade and yieldingly engageable with said bottom wall.

3. A noodle-making utensil comprising a receptacle having a bottom wall of substantially semi-circular cross-section with multiple extrusion holes therethrough, a shaft rotatably mounted in said receptacle with its axis coincident with the center of curvature of said bottom wall, and a blade mounted on said shaft and peripherally engaging said bottom wall, said holes having tabs extending upwardly therefrom and providing cut-off edges cooperable with said blade with a rotary cutoff action therebetween in response to the relative motion between said blades and said cutoff edges of said holes.

4. A noodle-making utensil comprising a receptacle having a bottom wall of substantially semi-circular cross-section with multiple extrusion holes therethrough, a shaft rotatably mounted in said receptacle with its axis coincident with the center of curvature of said bottom wall, and a blade mounted on said shaft and peripherally engaging said bottom wall, said blade having a resilient wiper on each peripheral edge thereof yieldingly engageable with said bottom wall, said holes having tabs extending upwardly therefrom and providing cut-off edges cooperable with said wiper with a rotary cutoff action therebetween in response to the relative motion between said wipers and said cutoff edges of said holes.

References Cited in the file of this patent

UNITED STATES PATENTS

| 52,693 | Devines | Feb. 20, 1866 |
| 536,527 | Hoyle | Mar. 26, 1895 |
| 909,306 | Kern | Jan. 12, 1909 |
| 1,418,231 | Carlino | May 30, 1922 |
| 1,608,460 | Blankinship | Nov. 23, 1926 |
| 1,621,823 | Ayers | Mar. 22, 1927 |

FOREIGN PATENTS

| 116,244 | Austria | Feb. 10, 1930 |